Feb. 26, 1929.        J. BOYKOW        1,703,386
BOMB SIGHT
Filed Aug. 23, 1921        2 Sheets-Sheet 1
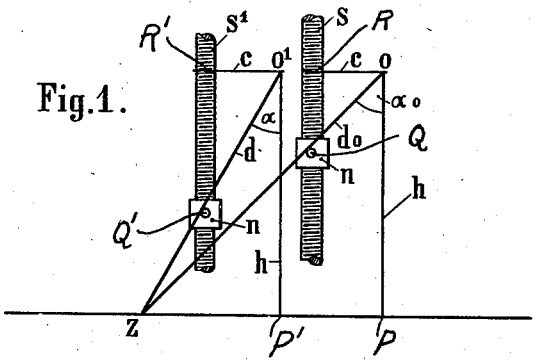
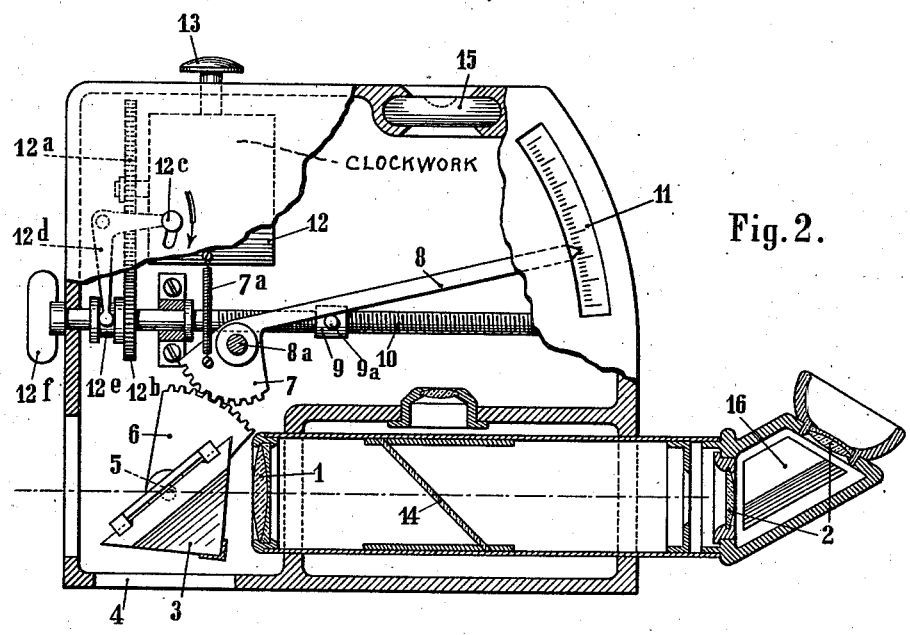
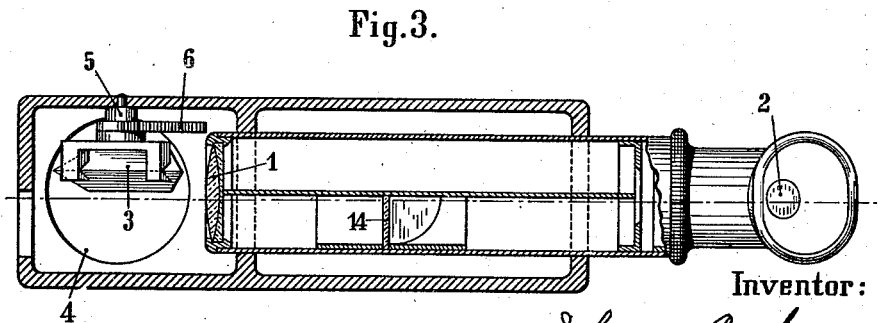
Inventor:
Johann Boykow
by
Leo J. Matty
atty.

Feb. 26, 1929.

J. BOYKOW 1,703,386

BOMB SIGHT

Filed Aug. 23, 1921     2 Sheets-Sheet 2

Inventor:
Johann Boykow

Patented Feb. 26, 1929.

1,703,386

UNITED STATES PATENT OFFICE.

JOHANN BOYKOW, OF SCHONEBERG, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

BOMB SIGHT.

Application filed August 23, 1921, Serial No. 494,492, and in Germany July 18, 1914.

(GRANTED UNDER THE PROVISIONS OF THE ACT OF MARCH 3, 1921, 41 STAT. L., 1313.)

If a bomb or other heavy body is allowed to fall to the ground from a sailing aircraft, the bomb remains permanently substantially vertically below the aircraft irrespective of deviation due to the resistance which the air opposes to the flying bomb and prevents it from retaining exactly the velocity which it had when released from the aircraft. Therefore, in order to hit a special target lying in the path of an aircraft with a bomb, it is necessary to release the bomb from the aircraft at a moment when the distance of the target from the aircraft in horizontal direction is equal to the distance traversed by the aircraft during the falling of the bomb. In order to ascertain the exact moment for releasing a bomb from an aircraft in order to strike a target lying on or beneath the path of an aircraft, it is necessary to take into consideration the velocity of the aircraft and its height from the ground. The height of an aircraft from the ground can comparatively easily be ascertained, but the velocity can usually not be ascertained with the required quickness and exactness.

This invention has for its object to provide an improved method and improved means whereby to overcome such difficulty. The invention, therefore, consists in a new method and device for controlling on an aircraft the right moment of release of a bomb or other heavy body, such as a letter-box or the like, so as to cause the same to strike any desired target on the ground in the path of the aircraft.

My improved method consists in directing a suitable sight towards the target to be hit by the bomb or the like at a time when the target is still at a distance, where it could not be hit by a bomb if dropped, and thereafter imparting to the sight a swinging movement according to a predetermined rule, and thereby make the line of sight steeper with regard to the ground and observing the moment when the target again coincides with the continuously moved line of sight. If the rule, according to which the line of sight is swung from the preliminary observation of the target to the said second or final observation of the target, is properly determined, then the moment when the target appears again in said line of sight is the moment, when the bomb must be released from the aircraft in order to reach the target.

The swinging movement which according to the invention is to be given to the line of sight for observing the target can be properly produced by a screw acting on the sight so as to transport the point of intersection of the line of sight with the screw with uniform velocity in the direction of the screw.

If it is intended to control the adjustment of the direction of vision by a screw having a fixed distance from the pivot of sight about which its line of sight is swung and a certain invariable angular velocity, then it is necessary to so take the preliminary vision of the target with the sight being so adjusted that its direction of vision includes a certain predetermined angle with a standard direction which is in definite angular relation to the direction of gravity.

However, such limitation which necessitates the observer making the preliminary observation of the aim with a definite adjustment of the sight is somewhat inconvenient to the observer. It is more feasible to make the preliminary observation of the aim at an arbitrary moment. This can be done according to a further part of this invention.

As to the constructional means which are necessary in order to carry the invention into effect, they consist broadly of a sight so constructed and arranged as to allow adjustment of its direction of view and an actuating device for such sight so constructed as to allow angular displacement of the line of sight according to a prescribed law.

The invention is illustrated on the drawing, wherein

Fig. 1 illustrates the geometrical principles of the invention, and

Figs. 2 and 3 show a constructional arrangement in accordance with the invention in side elevation and in plan respectively, the figures representing the elements partly in section.

Figure 4:
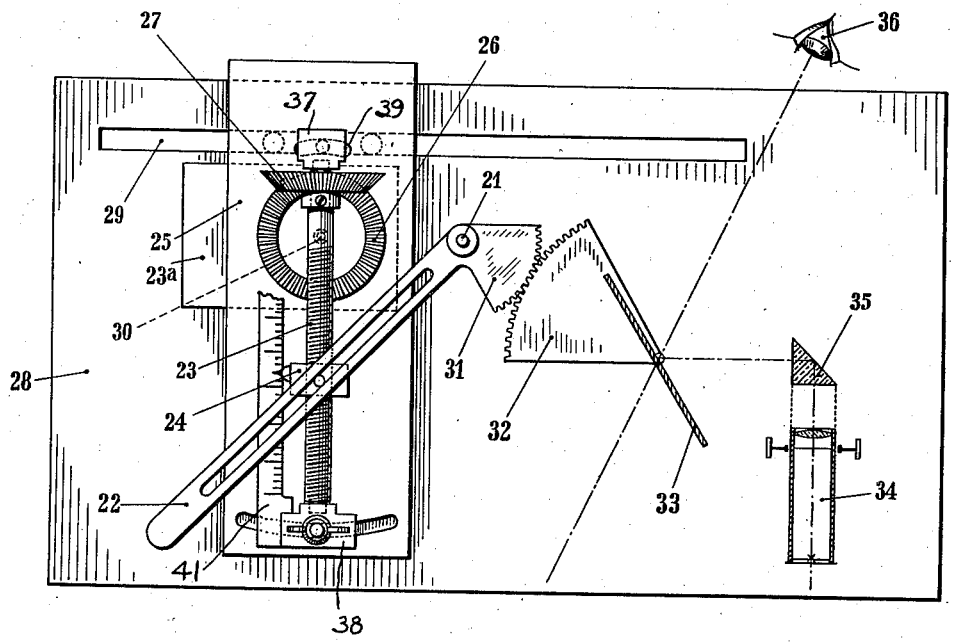
Fig. 4 shows merely diagrammatically a modified form of the construction.

In Fig. 1 the reference letters O and $O_1$ designate two different positions of an aircraft, the position O being that at which a preliminary sight towards the target Z is taken, and the position $O_1$ that at which the final vision of the target is taken, this being the sight at the moment where the bomb is to be dropped from the aircraft in order to secure a hit. The reference letters $d_o$ and $d$ designate the line of sight from the aircraft positions O and $O_1$ to the target Z. $s$ and $s_1$ is a transporting screw actuated by a suitable clock work or the like and adapted to rotate under such actuation with uniform velocity. The two screws appearing in the figure of the drawing designated $s$, $s_1$ are one and the same screw which is shown in different positions corresponding to the different positions O and $O_1$ of the aircraft. The screw $s$, $s_1$ is so coupled with the sight as to produce a swinging movement of the line of sight about the pivots O and $O_1$ respectively, and so that the angle between the sight and the vertical direction is continuously changed when the screw $s$ is rotated. The two positions of the line of sight appearing from Fig. 1 are defined by the angles $\alpha_o$ and $\alpha$. The height of the aircraft above the ground may be assumed to be equal to $h$ and correspond to a duration of free fall of the bomb from the aircraft to the ground of T, and the distance of the screw $s$ or $s_1$ from the pivot O or $O_1$ of the sight or line of sight $d_o$ or $d$ is designated on the drawing with the reference letter $c$. The reference letter $n$ designates a screw nut on screw $s$, $s_1$ adapted to communicate to the sight a swinging movement about pivot O or $O_1$.

It can be shown that in the case of a drive of screw $s$ so as to communicate to nut $n$ a displacement on screw $s$ with a velocity equal to $k$ and on adjusting the sight for the preliminary vision in a manner so that the trigonometrical function $tg\alpha_o$ is equal to $$\frac{c}{k.T}$$

that the sight with its line of sight is transported by nut $n$ from the position $d_o$ to the position $d$ just within the time which the aircraft requires for passing from the position $O_1$ to a point of its path vertically above the target Z. Therefore, it is only necessary to adjust the sight for preliminary vision in accordance with the actual height of the aircraft above the ground according to the law expressed by the formula $$tg\alpha_o = \frac{c}{k.T}$$

and to take a preliminary vision of the aim under the inclination $\alpha_o$ and to then release the drive for the screw $s$ in order to correctly adjust the sight for the release of the bomb so as to hit the aim Z. The correctness hereof can be ascertained as follows with reference to Figure 1 of the drawings.

In Figs. 2 and 3 the numeral 1 designates the objective and 2 the ocular of a telescope whereby to observe the line of sight towards objects on the ground over which the aircraft carrying the device is sailing. 3 is a rotatable reflector lying in front of one part of the objective only. The reflector 3 is positioned behind a window 4 in the casing and rotatable about a pivot pin 5. The axle of the reflector is provided with a toothed segment 6 meshing with the sector 7 connected to an arm 8. The arm 8 is adapted to be rotated about its pivot $8^a$ by a nut 9 having a pin $9^a$ on a screw 10. The arm 8 is rigidly connected with the sector 7 and is permanently held in contact with pin $9^a$ on nut 9 by a spring $7^a$ or the like. The adjustment of the arm 8 can be read on a scale 11 so that the position of arm or pointer 8 with relation to scale 11 is in indirective for the angular adjustment of reflector 3. The scale 11 provides for adjustment of arm 8 as required according to different heights of the aircraft. The screw 10 is controlled by a clockwork 12 having a driving wheel $12^a$ meshing with the wheel $12^b$ slidable on the shaft of screw 10. The clock work is provided with a locking and unlocking knob 13. $12^c$ designates a clutch actuating knob on a lever $12^d$ operatively connected with a clutch $12^e$ slidable on screw shaft 10. $12^f$ is a handle on said screw shaft for winding up the clock work and returning the nut 9 and the arm 8 to the normal position. 14 designates a glass plate with plane parallel surfaces in front of which a level 15 is arranged. The position of the bulb of level 15 can be observed on looking into the telescope an image of the bulb being reflected by glass plate 14 towards the ocular of the instrument. The ocular comprises in known manner a roof-shaped prism 16 for erecting the image.

The use and operation of the device is as follows:

The height of the aircraft having been ascertained, the clock work 12 is wound up to such a degree that nut 9 is displaced on screw 10 to such an extent that arm 8 is properly adjusted in accordance with the height in question. The adjustment of nut 9 is to be made in accordance with the above mentioned rule expressed as a mathematical formula $$tg\alpha_o = \frac{c}{k.T}$$

in which formula the angle $\alpha_o$ means the angle between arm 8 and screw 10 and the values of $c$ and $k$ are charcteristic the one for the distance of screw 10 from the pivot $8^a$ of the arm 8 and the other $k$ for the velocity with which nut 9 is transported on screw 10 by clock work 12; the items $c$ and $k$ are known as depending solely upon the constructional data of the device. T is the duration of the bomb fall from the aircraft to the ground which is likewise known owing to the fact that each aircraft has a height indicating device (aneroid) and that the duration of the bomb fall depends from the height of the aircraft above the ground.

Assume that at the moment when the preliminary sight is taken at point O nut $n$ is so adjusted on screw $s$ that the distance R Q is equal to $k$ T where $k$ is the transporting velocity of nut $n$ on screw $s$ and T the duration of fall of the bomb from the aircraft to the ground corresponding to its height $h$.

If then O' is that point at which the bomb must be released in order to meet the target Z and if it requires a time interval equal to $t$ in order to bring nut $n$ from position Q to position Q' then the same interval of time must be required to bring the aircraft from point O to point O' if the above statement as to the required adjustment of nut $n$ for the preliminary vision shall be correct. Let us now assume that the statement is not correct and that the time which is required to bring the air craft from O to O' with its unknown velocity $v$ is equal to T. Then we have the following equations.

1. $tg a_0 = \dfrac{z-p+p'-p}{h} = \dfrac{v(T+T)}{h} = \dfrac{c}{k.T}$

2. $tg a = \dfrac{Z-P'}{h} = \dfrac{v.T}{h} = \dfrac{c}{K(T+T)}$

By transformation of equations 1 and 2 we get

3. $c = \dfrac{k.T.v(T+T)}{h}$

4. $c = \dfrac{k(T+t)v.T}{h}$ and therefore

5. $k.T.v(T+t) = k(T+t)v.T$

This equation is only fulfilled if $t = T$. This means that if a preliminary vision is made with nut $n$ adjusted on screws so that the distance R Q = $k$ T and if the nut is released at the moment of preliminary vision and the bomb thrown off at the moment when the target Z again goes through the line of sight, then the aircraft passes through the distance Z P' exactly within the same period of time T which the bomb requires to fall within the airless space through a height $h$ which is the height of the aircraft above the target. This is in conformity with the result above anticipated.

Thereafter the instrument is brought to such a position that the bulb of the level is in zero position or that the instrument is directed towards any distant object until the image of such object appears within the instrument. At this moment knob 13 is operated and the clock work 12 thereby released, so that screw 10 begins to rotate. When the image appears again within the field of view of the instrument, taking care that the bulb of the level also appears in rest or normal position, or that the instrument is directed towards the distant object, the bomb is released.

The main difference between the device shown in Fig. 4 from that of Figs. 2 and 3 just described consists in the fact that the screw controlling the position of the adjustable reflector is not fixedly arranged with relation to the adjusting device for the reflector but is movable, so as to allow change of the distance of the screw from the pivot of the adjusting member.

In Fig. 4 the numeral 21 designates the pivot of an adjusting member 22 for adjusting the sight of the instrument. 23 is the screw in operative connection with the adjusting member 22 and adapted to be rotated by a suitable clock work $23^n$ or the like. 24 is a nut adjustable on screw 23 and cooperating with adjusting member 22 which is provided with a slot so as to allow a pin on nut 24 to slide therein on adjustment of the nut on screw 23. 25 is the carrier for the screw adapted to be displaced with relation to pivot 21. Mounted on carrier 25 is a driving toothed wheel 26 meshing with the conical wheel 27 on shaft 23. 28 is a base plate of the instrument provided with a slot 29 wherein the carrier 25 for the screw 23 and cooperating parts is guided. 30 is a pivot about which screw 23 can be rotated without bringing wheels 26 and 27 out of mesh with each other. 37 and 38 are bearings for screw 23 guided in curved slots 39 and 40 respectively so as to partake in the swinging movement of screw 23 about pivot 30. 41 is a scale fixed to bearing 38 so as to participate in the swinging movement of screw 23 about pivot 30. 31 is a toothed sector on adjusting member 22 meshing with toothed sector 32, fixed on reflector 33. 34 is a collimator in Cardanic suspension and 35 a reflector by which an image of the mark provided in the collimator is reflected towards reflector 33 which reflects the same to the eye 36 of the observer. The reflector 33 is semi-transparent so that the observer is able to observe through said reflector the ground over which the aircraft sails. At the same time the observer sees the image of the mark of the collimator so that by coincidence of the image of the collimator mark with a special target the correct direction of vision can be ascertained.

The use of this modified form of construction is as follows:

If it is intended to hit a special target lying in the direction of the path of the aircraft with a bomb, the observer takes a preliminary vision towards said target. For this purpose he displaces the carrier 25 of screw 23 till the target which he observes through reflector 33 coincides with a mark of the collimator. Such preliminary vision must be taken prior to the instant where the bomb is to be thrown off. At the instant in which the target and the collimator mark coincide, the drive for screw 23 is put into action. This starts a displacement of nut 24 and consequently rotation of reflector 33. Coincidence of the target and of the image of the collimator mark subsequently takes place. Assuming that nut 24 was correctly adjusted on screw 23 along scale 41 in conformity with the height of the aircraft (the nut forming a pointer corresponding to arm 8 of the embodiment illustrated in Figures 2 and 3) and that screw 23 is driven with a certain predetermined velocity which is equal for all positions of carrier 25, the moment of this second or final vision towards the target is the correct moment for throwing off the bomb in order to hit the target.

Heretofore it has been assumed that the bomb is falling within the airless space, so that it falls exactly vertically with relation to the aircraft from which it has been thrown off. But the resistance of the air communicates to the bomb a certain back drift the amount of which mainly depends from the special kind of bomb which is used and upon the velocity of the aircraft with relation to the air. The back drift caused by the air requires compensation. This can be obtained by adjusting screw 23 about the pivot 30 in such a manner that the screw is brought into a position parallel to a line drawn from the hitting point of the bomb to the aircraft from which the bomb has been thrown off in the moment when the bomb hits the ground. The direction of this line and consequently the necessary adjustment of screw 23 can be found by calculation. If screw 23 is adjusted the conical wheel 27 makes a rolling movement on the teeth of wheel 26 and, therefore, can be effected without difficulty.

The collimator sight illustrated on the drawing may be replaced by any other kind of sight.

I have filed application for Letters Patent in Germany July 18, 1914, and December 18, 1920; Austria on May 12, 1917; and Hungary on May 22, 1917.

What I claim is:

1. A bomb sight comprising a frame, a sight having a member pivotally adjustable on said frame, an automatically operating drive for said pivotable sight member adapted to communicate to it a swinging movement about its pivot, a scale and a pointer, said pointer in operative connection with said pivotable member so as to be adapted to become automatically displaced thereby.

2. A bomb sight comprising a frame, a sight having a member pivotally adjustable on said frame, an automatically operating drive, means interconnecting said drive and pivotable sight member, said means comprising a member guided for rectilinear movement and adapted to be moved by said drive with uniform velocity, a scale and a pointer, said pointer in operative connection with said rectilinearly movable member so as to become automatically displaced thereby with relation to said scale.

3. A bomb sight comprising a frame, a sight having a member pivotally adjustable on said frame, a scale and a coordinated pointer, the pointer in operative connection with said pivotable sight member and adapted to indicate the adjustment of said sight member on said scale, an automatically operating drive for said pivotable sight member, the angular velocity of said sight member communicated to it by said drive varying with its adjustment indicated by the pointer on said scale.

4. A bomb sight comprising a frame, a sight having a reflector member pivotally adjustable on said frame, a scale and a co-ordinated pointer, the position of the pointer with relation to the scale being indicative for the adjustment of said reflector member, a driving screw, a nut displaceable thereon in operative connection with said reflector member and means allowing adjustment of the instrument with relation to a specified direction in the space and to observe rays coming from a target and reflected by said reflector member with the instrument so adjusted.

5. A bomb sight comprising a frame, a sight having a member pivotally adjustable thereon, a driving screw, means mounting said screw on the frame for movement to and from the axis of the member, a nut on said screw, and means interconnecting said nut and sight member whereby the member may be actuated by rotation of the screw or by bodily movement thereof to or from said axis.

6. A bomb sight comprising a frame, a collimator sighting device having a plane surface element pivoted to said frame being simultaneously reflecting and transparent, a pivotally mounted controlling element for said plane surface member, a driving screw for said controlling element, means mounting said screws on the frame for movement to and from the pivot of said controlling element, a nut on said screw and means interconnecting said nut and controlling element whereby the element may be actuated by rotation of the screw or by bodily movement thereof to or from said pivot.

7. A bomb sight comprising a frame, a collimator sighting device having a plane surface element pivoted to said frame being simultaneously reflecting and transparent, a driving screw, means mounting said screw on the frame for movement to and from the pivot axis of said plane surface element and for angular adjustment of its axis, a nut on said screw and means interconnecting said nut and plane surface element whereby the element may be actuated by rotation of the screw in dependence from the angular adjustment of the axis of the screw or by bodily movement of the screw to and from the pivot axis of the plane surface element.

8. A bomb sight comprising a frame, a collimator sighting device having a plane surface element pivoted to said frame being simultaneously reflecting and transparent, a screw, a carrier therefor having rotatably mounted thereon a driving conical wheel, said carrier mounted on said frame for movement to and from the pivot axis of said plane surface element, the screw being mounted on said carrier so as to allow as well rotation as angular adjustment of its axis and carrying a conical wheel meshing with said driving conical wheel on said screw carrier, a nut on said screw and means interconnecting said nut and plane surface element whereby the element may be actuated by rotation of the screw independently of the angular adjustment of the axis of the screw or by bodily movement of the screw to and from the pivot axis of the plane surface element.

In testimony whereof I have signed this specification.

JOHANN BOYKOW.